US005666348A

United States Patent [19]
Thornberg et al.

[11] Patent Number: 5,666,348
[45] Date of Patent: Sep. 9, 1997

[54] PACKET SWITCHED RADIO CHANNEL ADMISSION CONTROL IN A CELLULAR TELECOMMUNICATIONS SYSTEM

[75] Inventors: Carl Magnus Thornberg; Magnus Andersson, both of Stockholm; Olle Erik Grimlund, Bromma, all of Sweden

[73] Assignee: Telefonaktiebolaget L M Ericsson (publ.), Stockholm, Sweden

[21] Appl. No.: 529,569

[22] Filed: Sep. 18, 1995

[51] Int. Cl.[6] .................. H04Q 7/22; H04B 7/212
[52] U.S. Cl. ............. 370/230; 370/322; 370/348; 370/443; 370/915
[58] Field of Search ................. 370/95.1, 95.3, 370/85.6, 85.7, 94.1, 230–234, 322, 329, 336, 337, 338, 347, 348, 442, 443, 915; 455/33.1, 33.2, 34.1; 379/59, 60, 63

[56] References Cited

U.S. PATENT DOCUMENTS

| | | | |
|---|---|---|---|
| 4,551,833 | 11/1985 | Turner | 370/60 |
| 4,757,460 | 7/1988 | Bione et al. | 364/514 |
| 4,771,391 | 9/1988 | Blasbalg | 364/514 |
| 4,870,408 | 9/1989 | Zdunek et al. | 340/825.03 |
| 4,979,168 | 12/1990 | Courtois et al. | 370/95.1 |
| 4,984,264 | 1/1991 | Katsube | 379/197 |
| 5,050,161 | 9/1991 | Golestani | 370/60 |
| 5,070,498 | 12/1991 | Kamuma et al. | 370/60 |
| 5,090,011 | 2/1992 | Fukuta et al. | 370/60 |
| 5,131,020 | 7/1992 | Liebesny et al. | 379/59 |
| 5,193,151 | 3/1993 | Jain | 395/200 |
| 5,220,674 | 6/1993 | Morgan et al. | 395/800 |
| 5,226,045 | 7/1993 | Chuang | 370/95.3 |
| 5,276,677 | 1/1994 | Ramamurthy et al. | 370/60 |
| 5,315,587 | 5/1994 | Kullander | 370/60 |
| 5,317,562 | 5/1994 | Nardin et al. | 370/16 |
| 5,335,222 | 8/1994 | Kamoi et al. | 370/60 |
| 5,357,507 | 10/1994 | Hughes et al. | 370/60 |
| 5,363,373 | 11/1994 | Nakahara et al. | 370/95.1 |
| 5,383,181 | 1/1995 | Aramaki | 370/60 |
| 5,400,329 | 3/1995 | Tokura et al. | 370/84 |
| 5,402,417 | 3/1995 | Aramaki | 370/60 |
| 5,497,504 | 3/1996 | Acampora et al. | 45/33.2 |
| 5,521,925 | 5/1996 | Merakos et al. | 370/95.3 |
| 5,533,024 | 7/1996 | Owada | 370/84 |
| 5,537,395 | 7/1996 | Alles et al. | 370/17 |

FOREIGN PATENT DOCUMENTS

| | | |
|---|---|---|
| 0 332 818 | 1/1989 | European Pat. Off. . |
| 0 415 898 A1 | 8/1990 | European Pat. Off. . |
| WO86/00775 | 1/1986 | WIPO . |
| WO95/03679 | 2/1995 | WIPO . |
| WO95/16330 | 6/1995 | WIPO . |

OTHER PUBLICATIONS

Wong & Britland, Mobile Data Communications Systems, Artech House, pp. 90–91 1995.
XV International Switching Symposium, vol. 1, 23 Apr. 1995 Berlin; GE, pp. 246–250, XP 000495573 Bianchi, et al. "Dynamic Channel Allocation Procedures for Packet Data Services over GSM Networks".

Primary Examiner—Douglas W. Olms
Assistant Examiner—Matthew C. Phillips
Attorney, Agent, or Firm—Jenkens & Gilchrist, P.C.

[57] ABSTRACT

A method and system for controlling admission to a packet switched radio channel (PRCH) is provided. A PRCH admission control function evaluates admission requests for users requesting admission to a PRCH. The admission requests each contain a priority value and an estimated data traffic for the requesting user. If the estimated data traffic from one or more packet calls currently using the PRCH and having a priority equal to or higher than the priority of the requesting user, plus the estimated data traffic required by the requesting packet call are less than a maximum tolerable traffic level, the packet call is granted admission.

20 Claims, 13 Drawing Sheets

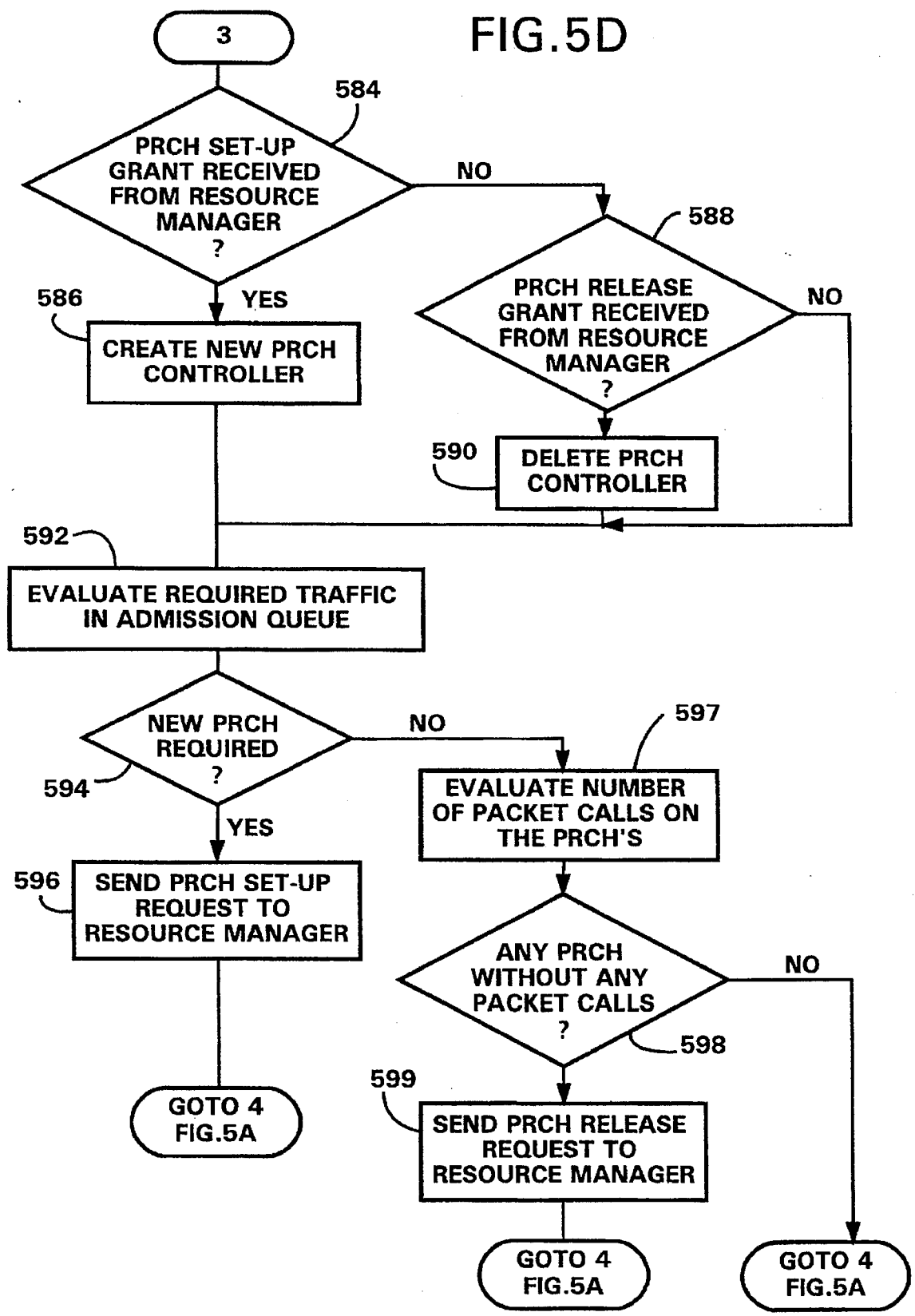

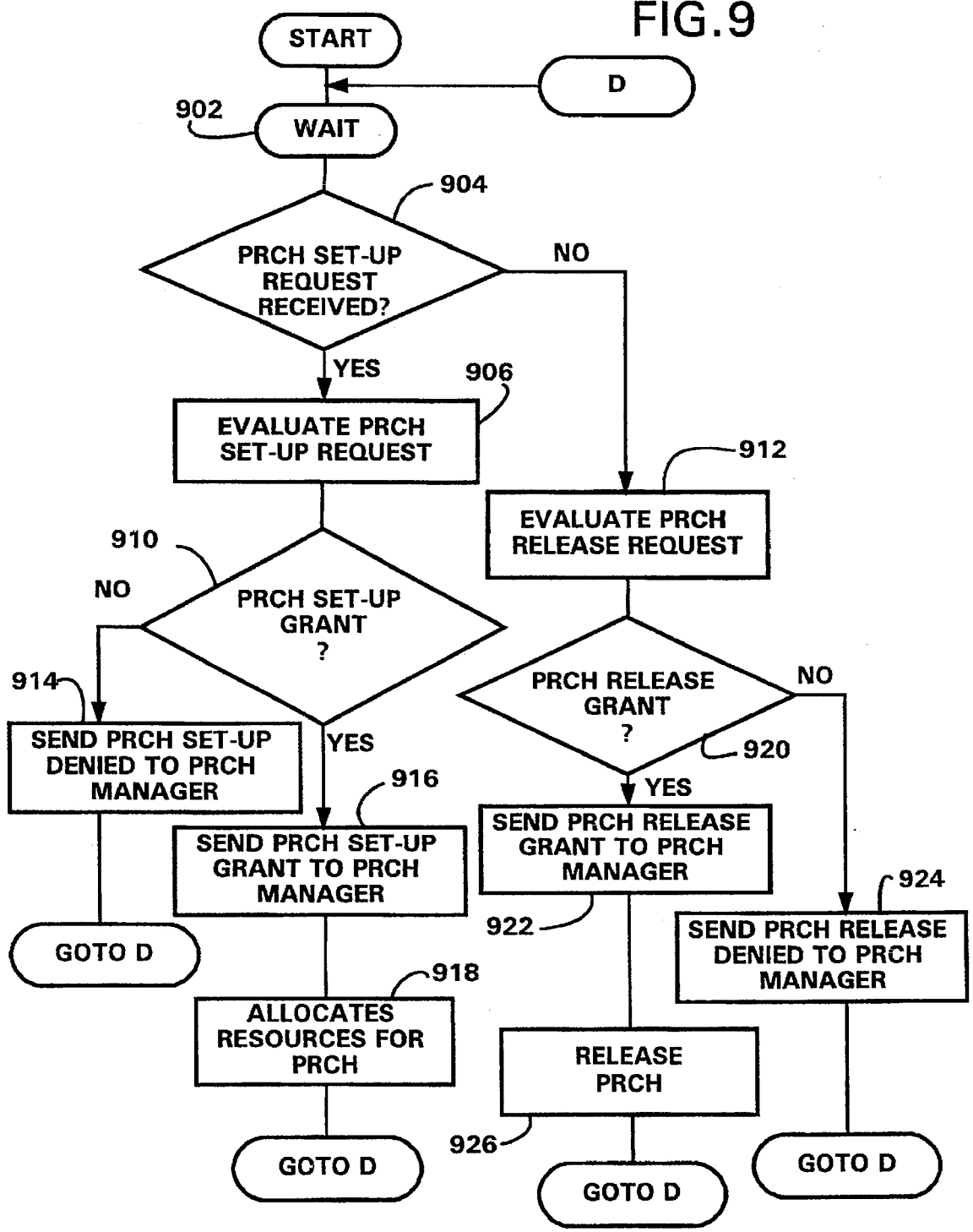

PACKET SWITCHED RADIO CHANNEL ADMISSION CONTROL IN A CELLULAR TELECOMMUNICATIONS SYSTEM

BACKGROUND OF THE INVENTION

1. Field of the Invention

This invention relates to packet switched telecommunications systems and, more particularly, to a method and system for controlling packet switched radio channel admission in a cellular telecommunications system.

2. History of the Prior Art

As the capability to offer a greater number and variety of services within cellular telecommunications systems develops, packet switched services will play an increasingly important role in the field of cellular telecommunications. The application of many computer and related data services to cellular systems requires the transfer of single or multiple data packets over the radio link of a cellular telecommunications system. Certain of these services such as e-mail and tele-banking may be implemented with a store and forward short message service. Other services, such as terminal emulation, local area networks, bank server access, and credit card verification, however, require interactive usage, short time delays and the capability to handle data packets of widely varying lengths. It is certain that future cellular systems will have to support such services with an efficient packet-data service.

Recognition of the importance of packet data services has resulted in the current effort of the European Technical Standards Institute (ETSI) to develop such a service for the European 2+ Group Special Mobile (GSM) cellular system. This recognition has also resulted in an effort to design packet-data service capability into the Universal Mobile Telephone System (UMTS) currently under development in the RACE II Code Division Testbed (CODIT) project R2020. The CODIT project was set up by the Commission of the European Community for the purpose of defining a future mobile telecommunications system using code division multiple access (CDMA) techniques.

Packet-switched data service in a cellular telecommunications network is characterized by calls from network users to mobile users being transmitted to packet switched mobile stations on the shared downlink (DL) of a packet switched radio channel (PRCH) and, by one or more mobile users sharing the uplink (UL) of the PRCH. The DL PRCH is shared by network users on a queued basis. The UL PRCH is shared by each mobile user accessing the channel in random fashion, as the mobile user requires, to transmit data to the system.

A common method of allowing access to the PRCH is through a packet-switched contention mode. The currently defined CODIT UMTS packet-data service is of the contention mode type. In the packet-switched contention mode mobile users transmit data packets on the PRCH when it is necessary to transfer data. An identification of the transmitting mobile user is contained in each data packet. The transmission of data packets by the mobile user may be done either randomly, or upon sensing an idle signal indicating that the packet-data channel is not presently used by another mobile station. If two or more mobile users simultaneously contend for an idle packet-data channel, the system will only allow one access to the channel. Mobile users unsuccessful at accessing the channel must repeat the transmission of the data packet until it is accepted by the system. The system users transmitting data packets to mobile users also contend for the downlink by being placed in a queue.

Because in such a system each user accesses the packet-switched channel in a random fashion, uncontrolled flow of users to, from, and between the packet-switched radio channels of a cellular system may cause packet transmission delays in the system. The delay may be incurred by both mobile users on the uplink and network users transmitting to mobile users on the downlink. As the number of packet calls on the packet switched channel increases, the average transmission delay for each packet call increases. In some applications the delays may be unacceptable.

Therefore, a need exists for a method and system for controlling packet transmission delay on one or more packet switched radio channels of a cellular system. If contending packet calls could be selectively chosen for admission to a packet radio channel according to predefined criteria, delays for packet switched channel users in applications that cannot tolerate a long packet delay time could be avoided and reduced.

A method and system for managing the flow of prioritized users to, from, and between one or more packet switched radio channels, with each packet switched radio channel having a maximum tolerable packet transmission delay, would meet such a need.

SUMMARY OF THE INVENTION

The present invention provides a method and system of packet switched radio channel admission control in a cellular telecommunications system. The invention allows a system operator to set the maximum average time delay that will be incurred in a packet call for a user allowed access to a packet switched radio channel (PRCH). By setting a maximum average time delay on one or more PRCHs of a system, a system operator can be assured that PRCH users are not subject to unacceptable packet transmission delays. Higher priority packet calls in which long packet delays cannot be tolerated can be admitted to a PRCH before packet calls having a lower priority. This avoids the problems associated with conventional contention mode packet switched systems in which users each randomly contend for use of the PRCH. In such conventional systems, the average time delay for data packet transmission rises as the number of users contending for the PRCH increases.

In one embodiment, the invention comprises a PRCH admission control function for each PRCH of a system. The admission control function receives admission requests from a PRCH manager requesting use of the PRCH for a packet call. The admission control function then generates either an admission granted or admission denied message to the PRCH manager. The PRCH admission control function evaluates the user's admission request for a packet call on a PRCH by determining if the estimated data traffic required by the packet call plus the traffic from current packet calls having a priority higher than, or equal to, the priority of the packet call is less than the maximum tolerable traffic. Separate or combined evaluations can be done for the uplink and the downlink. If a positive determination is made, the admission control function generates an admission granted message to the PRCH manager, and the packet call is admitted to the PRCH.

BRIEF DESCRIPTION OF THE DRAWINGS

A more complete understanding of the method and system of the present invention may be had by reference to the following detailed description when taken in conjunction with the accompanying drawings wherein:

FIGS. 5A–5D are flow diagrams illustrating process Steps followed by the packet radio channel management function according to an embodiment of the present invention;

FIGS. 8 and 9 are flow diagrams illustrating process steps followed by the packet radio channel controller congestion control function according to an embodiment of the present invention.

DETAILED DESCRIPTION

Figure 1:
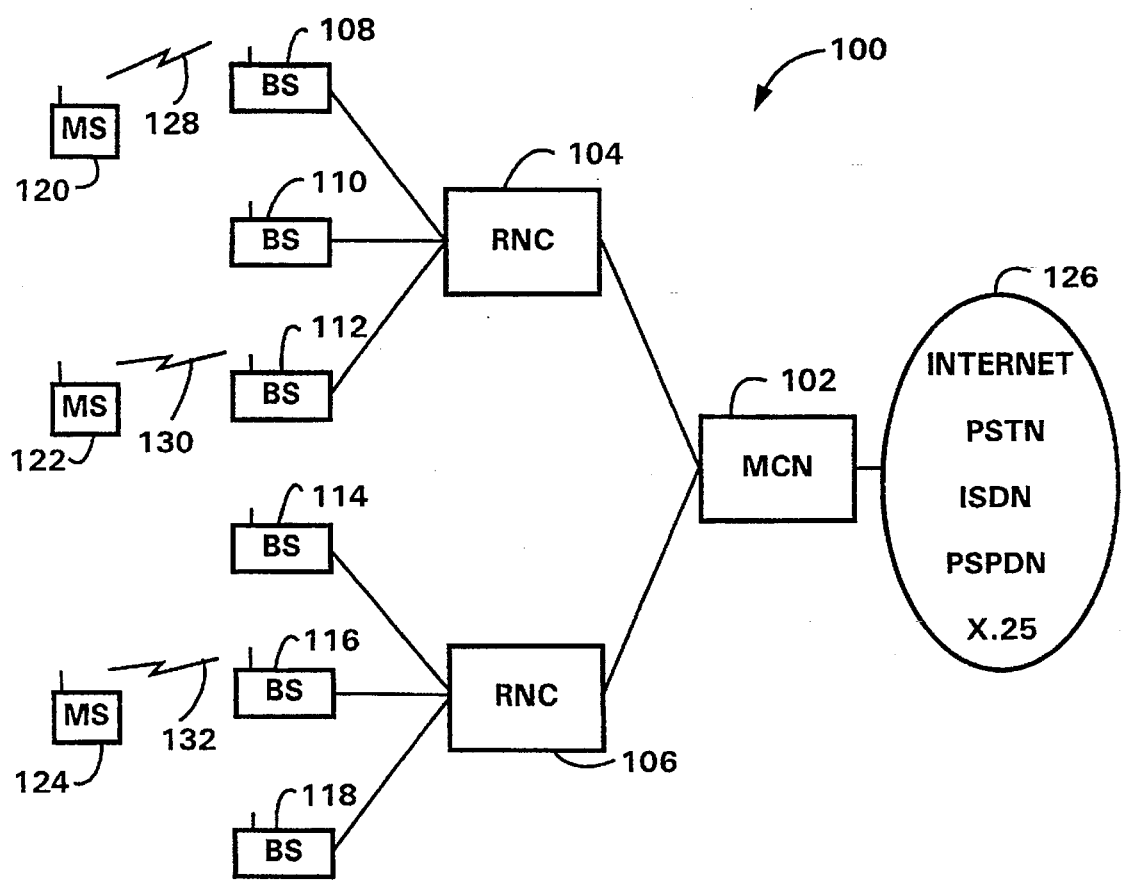
FIG. 1 is a block diagram of a cellular telecommunications system into which the present invention may be implemented.

Referring now to FIG. 1, therein is illustrated a block diagram of a cellular telecommunications system 100 into which the present invention may be implemented. Cellular system 100 comprises mobile control node (MCN) 102, radio network controllers (RNCs) 104 and 106, base stations (BSs) 108, 110, 112, 114, 116 and 118, and mobile stations (MSs) 120, 122 and 124. Each base station 108, 110, 112, 114, 116 and 118 controls system radio communications with mobile stations within the radio coverage area, termed a cell, of the base station. Mobile stations 120, 122 and 124 communicate with a particular base station, of base stations 108, 110, 112, 114, 116 and 118, depending on which base station's coverage area the mobile is located in. In FIG. 1 mobile stations 120, 122, and 124 are shown to be communicating via radio interfaces 128, 130 and 132 with base stations 108, 112 and 116, respectively. Base stations 108, 110 and 112 are connected to radio network controller 104, and, base stations 114, 116 and 118 are connected to radio network controller 106. Radio network controllers 104 and 106 are in turn connected to mobile control node 102. Mobile control node 102 is a switching center that supports the interconnection of the cellular system to fixed network 126. Mobile control node 102 may be connected to fixed network 126 by landlines or other equivalent connections. The fixed network 126 may comprise a internet network, public switched telephone network (PSTN), integrated services digital network (ISDN), a packet switched public data network (PSPDN), or a X.25 system. While the cellular telecommunications system of FIG. 1 is shown as a particular configuration, the block diagram is intended to be only an exemplary configuration of a system into which the present invention may be implemented. The invention has application to any packet switched radio system in which users contend for a packet switched radio channel (PRCH).

In an embodiment of the invention, cellular system 100 operates according to protocols developed for the Code Division Testbed (CODIT) Universal Mobile Telephone System (UMTS) project with the PRCH contention mode access specified for the CODIT/UMTS controlled by the PRCH traffic management function of the invention. The UMTS is a mobile communication system using direct sequence code division multiple access (DS-CDMA) with a multi-rate radio interface architecture. In the CODIT/UMTS system packet radio service is provided to mobile stations 120, 122 and 124 via one or more PRCHs. Each base station 108, 110, 112, 114, 116 and 118 establishes and terminates one or more PRCHs at the request of radio network controllers 104 and 106 or mobile control node 102. The PRCH is a full duplex, asymmetrical channel that can be operated independently on both the uplink (UL) and downlink (DL) at variable mobile station data rates up to 9.6 kbps (narrow band channel) or up to 64 kbps (medium band channel). MCN 102 can attach multiple mobile stations to a single PRCH within a single cell. To distinguish several mobile stations on a PRCH, MCN 102 assigns each mobile a virtual connection identifier (VCI) when it grants access. The VCI is represented by a k bit number and serves as a unique address within the area controlled by MCN 102.

The PRCH is structured in 10 ms time slots to convey fragmented packets between mobile stations 120, 122 and 124 and the network. On the DL, the mobile control node 102 can send mobile station data packets and information for controlling the access and data transfer on the UL to one mobile station or simultaneously to a plurality of mobile stations. On the UL, the mobile stations may share access to a UL PRCH if within the coverage area of the same base station. After gaining access to the PRCH, the mobile station transmits the packet to the system over a physical channel. The logical channel PRCH is mapped onto two physical channels comprising a physical data channel (PDCH) and a physical control channel (PCCH). Two base station transceivers are required for supporting one PRCH.

Figure 2:
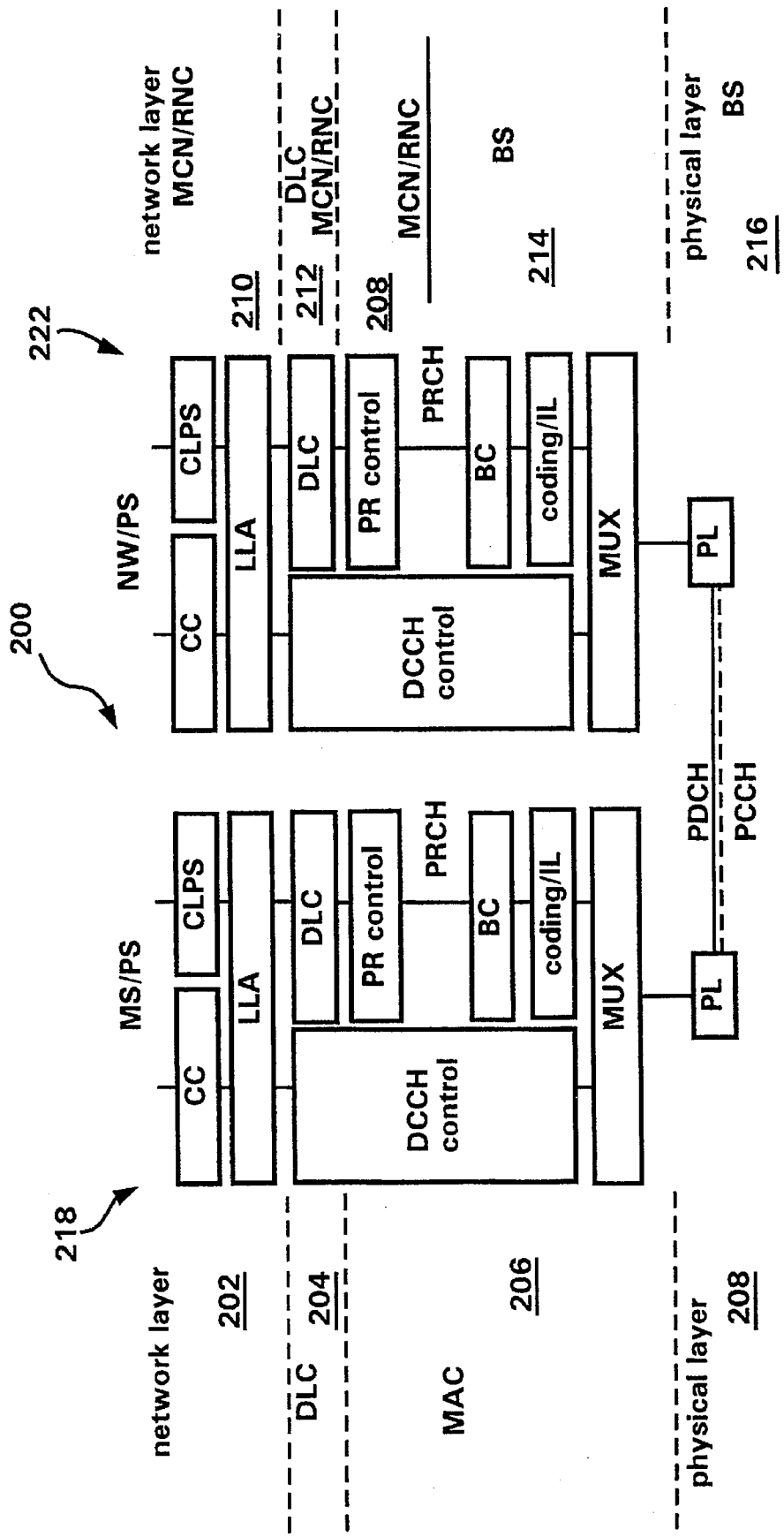
FIG. 2 illustrates the control plane protocol architecture for the packet switching functions of a cellular telecommunications system into which the present invention may be implemented.

Referring now to FIG. 2, therein is illustrated the protocol stack 200 for the packet switching functions of the CODIT/UMTS. In the mobile station the mobile station protocol stack (MS/PS) 218 comprises a network layer 202, data-link control (DLC) layer 204, a medium access control (MAC) layer 206, and the physical layer 208. On the network side, the network protocol stack (NW/PS) 220 comprises a network layer 210 and a DLC layer 212, each located within either the MCN or RNC, a medium access layer (MAC) 214 located within the base station and MCN or RNC, and a physical layer 216.

The connectionless packet service (CLPS) entity of network layer 202 provides the packet service to the mobile station. The CLPS of network layer 210 provides the functions of registration, authentication, assigning and administering VCIs and interfacing to a packet data network. During a packet call, the CLPS entities use a logical link administrator (LLA) to initially route packet service set-up signals via a dedicated control channel (DCCH and CC). After the packet service set-up, the mobile station is attached to a PRCH and all messages between the CLPS, including mobile station data packets, are passed through the DLC to a packet-radio (PR) control entity. The PR entity is also responsible for normal mobile telephone system functions such as handover, connection re-establishment, etc.

The packets to be transmitted on the PRCH are fragmented, protected with a block code (BC) for detecting transmission errors on the receiving side, convolutionally encoded, interleaved (IL), switched through a multiplexer (MUX) and then transmitted over the PDCH. Control information, e.g. for power control, may also be transferred via the PCCH. On the receiving side, the fragments are reconstructed from the received samples, reassembled into packets, and forwarded to a connectionless packet service (CLPS) entity. When a block decoder on the receiving side detects the receipt of an erroneous packet fragment, a packet radio control function requests its retransmission. In cellular system 100 there may be several PRCHs distributed among the cells controlled by base stations 108, 110, 112, 114, 116 and 118.

Figure 3A:
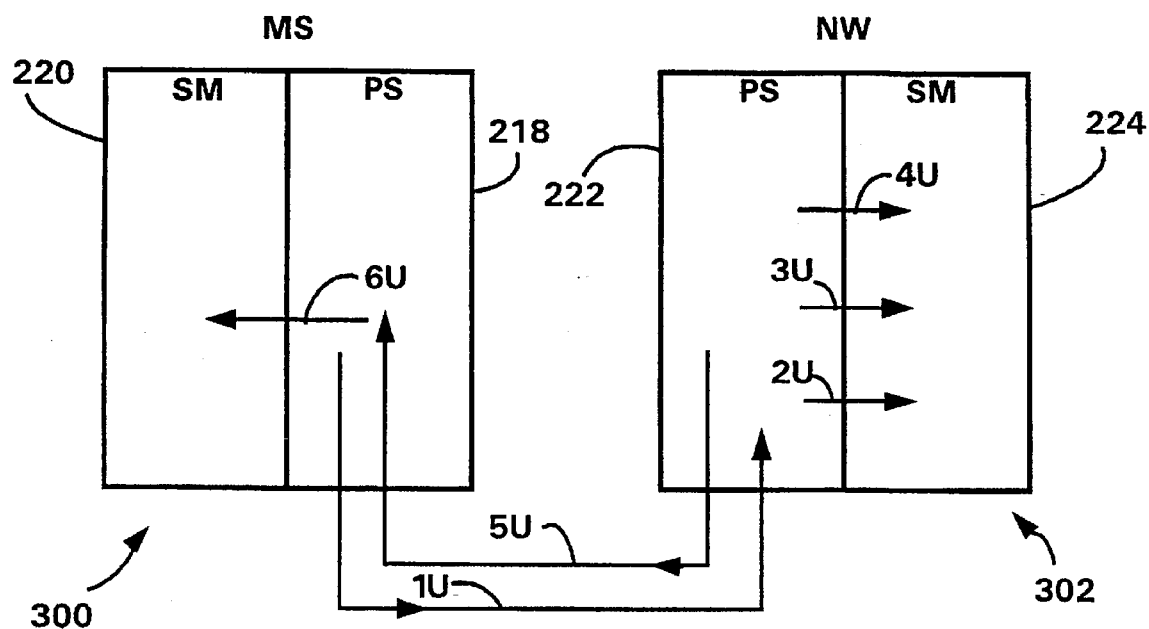
FIGS. 3A and 3B illustrate the exchange of signals on the downlink and uplink, respectively, of a cellular system packet radio channel operating according to an embodiment to the present invention.
Figure 3B:
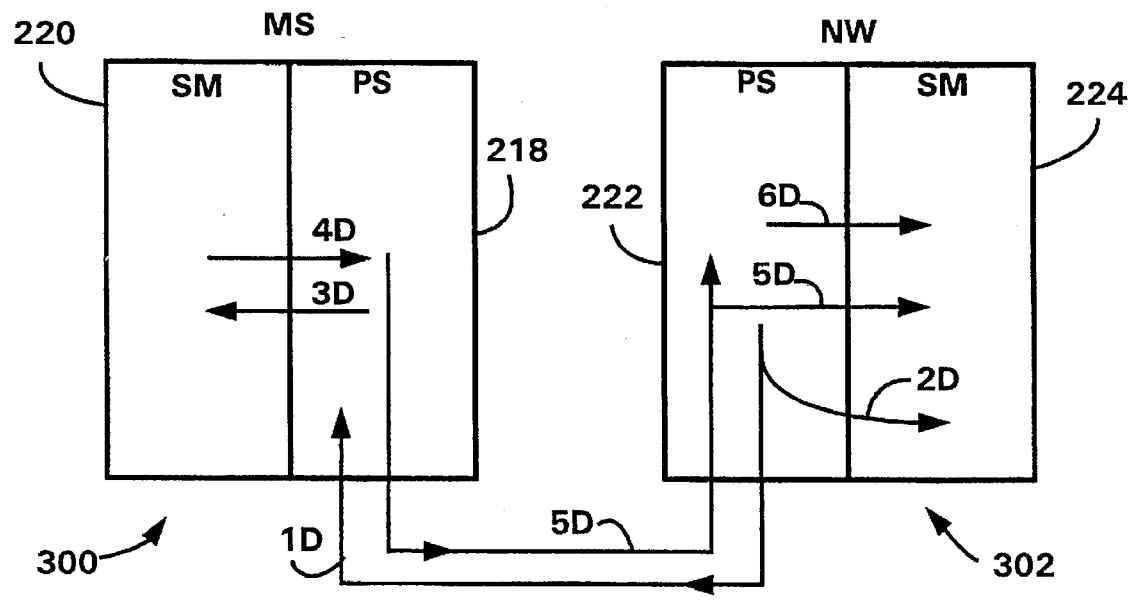

Referring now to FIGS. 3A and 3B, therein are illustrated the exchange of signals on the uplink (UL) and downlink (DL), respectively, of a cellular system PRCH operating according to the present invention. FIGS. 3A and 3B show the signal exchanges between a mobile station (MS) 300 and the network (NW) 302. Mobile station 300 is shown functionally as mobile station protocol stack (MS/PS) 218 and mobile station system manager (MS/SM) 220. Network 302 is shown functionally as network protocol stack (NW/PS) 222 and network system manager (NW/SM) 224. The protocol stack is responsible for data transmission and the system manager is responsible for control and supervision of the connection between the network and the mobile station.

For uplink (UL) packet transmission and reception the following scheme is used (the steps correspond to the numbering of the arrows in FIG. 3A).

1U. The MS/PS 218 can send three different kinds of packets to the NW/PS 222, two of which require acknowledgment.
  a. Packets requiring acknowledgment:
    packets containing user data; and
    packets containing user data with piggy-backed downlink reports (DLRs).
  b. Packets not requiring acknowledgment:
    packets containing only DLRs.
  A timer is set in MS/SM 220 when a packet requiring acknowledgment is sent. If the timer expires before an acknowledgment is received, the packet is considered to be lost.

2U. For all UL data packets, quality samples are sent to NW/SM 224. At the end of the UL packet a packet stop signal is sent to the NW/SM 224 indicating that the last quality sample has been sent for that particular packet.

3U. After receiving a UL data packet, a UL packet report is sent to NW/SM 224. This report contains information required for traffic supervision.

4U. If the UL packet contains a piggy-backed DLR or if the packet is a stand-alone DLR, the DL quality estimate is extracted and forwarded to NW/SM 224.

5U. If the transmitted UL data packet requires an acknowledgment, an acknowledgment message is sent from NW/PS 222 to the MS/PS 218. The message can be either stand-alone or piggy-backed on a DL mobile station information packet.

6U. Upon receiving an acknowledgment in MS/PS 218, A packet acknowledged signal is sent to MS/SM 220. If no acknowledgment is received before the timer introduced in Step 1 above expires, a packet lost message is sent to the MS/SM 220.

For DL packet transmission and reception the following scheme is used (the steps correspond to the numbering of the arrows in FIG. 3B):

1D. The NW/PS 222 can send three different kinds of packets to the MS/PS 218, two of which require acknowledgment.
  a. Packets requiring acknowledgment:
    packets containing user data; and
    packets containing user data with piggy-backed acknowledgment/no acknowledgment (ack/nack) information for previously received UL packets.
  b. Packets not requiring acknowledgment:
    packets containing only ack/nack information for previously received UL packets.
  A timer is set when packets requiring acknowledgment are sent. If the timer expires before an acknowledgment is received, the packet is considered to be lost.

2D. When a DL data packet is transmitted, a DL packet report is sent to NW/SM 224. The report contains information required for traffic supervision.

3D. When receiving a DL data packet in MS/PS 218, quality samples are extracted for each frame and sent to MS/SM 220. At the end of the DL packet, a packet stop signal is sent to MS/SM 220 indicating that the last quality sample has been sent for that particular packet.

4D. After receiving a packet stop signal, a quality estimate is sent to MS/PS 218. This estimate is a measure of the quality of the entire packet sent on the DL.

5D. A DownLink Report (DLR) containing an ack/nack message and a quality estimate is sent to NW/PS 222 for each received DL packet containing user data. The DLR can be sent either stand-alone or piggy-backed on a UL user data packet. After receiving the DLR in NW/PS 222, the quality estimate is forwarded to NW/SM 224.

6D. If the ack/nack information in the DLR contains an acknowledgment, a packet acknowledged signal is sent to NW/SM 224. If no acknowledgment is received before the timer introduced in Step 1 above expires, a packet lost message is sent to the NW/SM 224.

Figure 4:
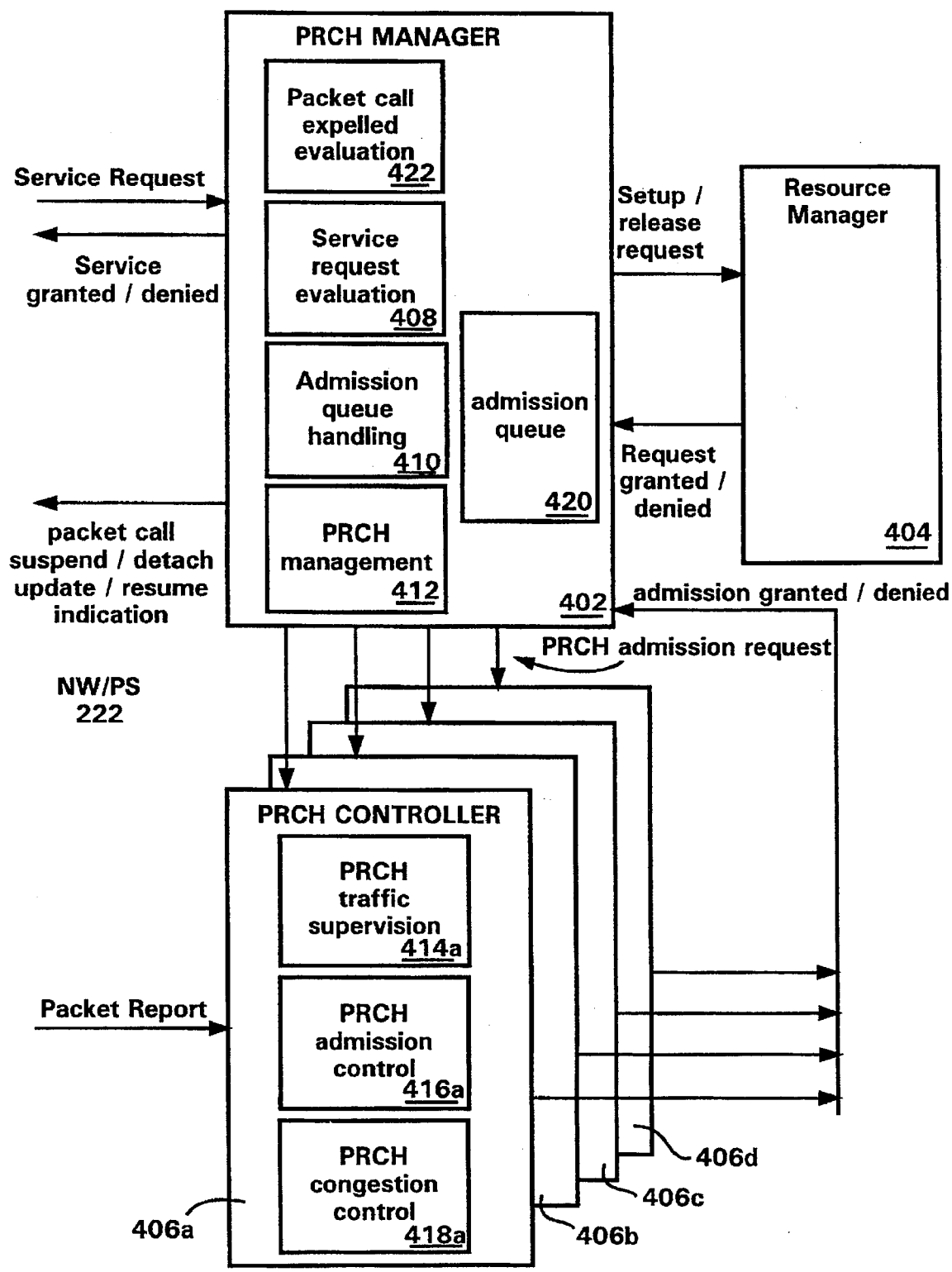
FIG. 4 is a functional block diagram of packet radio traffic management functions within a cellular system operating according to an embodiment of the present invention.

Referring now to FIG. 4, therein is a functional block diagram of packet radio traffic management functions within a cellular system operating according to the present invention. The functionality of the packet radio traffic management, which is logically located in the NW/SM 224, comprises three main blocks. PRCH manager 402, resource manager 404 and PRCH controllers 406a, 406b, 406c and 406d. Normally, there is one PRCH manager 402 for each base station of the system. If a base station supports more than one cell, there is one PRCH manager 402 for each cell. The number of PRCH controllers 406a, 406b, 406c and 406d, depends on the number of PRCHs necessary and, resources available, for packet switched traffic in the cell. In the embodiment shown in FIG. 4 there are four PRCHs in the cell. Each PRCH controller controls one PRCH. The PRCH manager 402 is invoked when it is necessary for a user to have access to a PRCH of the cell. Receival of a service request via the NW/PS 222 invokes the PRCH manager 402. The PRCH manager 402 will also be invoked if a packet call has been expelled from a PRCH due to congestion and a packet call expelled indication is received from a PRCH controller. Additionally, the PRCH manager 402 will be invoked if an internally generated admission queue signal or a PRCH setup grant/denial or release grant/denial signal from the resource manager is received.

A service request could be received in any of the following situations:

1) A new user wants access to a PRCH to initiate packet switching service.

2) A user wants to make handover from a PRCH of another cell to a PRCH of the cell in which PRCH manager 402 is located.

3) A user wants to re-establish a lost PRCH connection.

4) A user wants to update its traffic requirements, see below.

Each traffic event listed above results in a service request being forwarded to the PRCH manager. The service request contains information necessary for evaluation by service request evaluation function 408 of PRCH manager 402. The information includes:

Type of request

Required estimated average user data traffic, $P_{ave}$ (scaled to the maximum user bitrate of the PRCH). This comprises separate parameters for each of the UL and DL.

Required estimated maximum user data traffic, $P_{max}$ (scaled to the maximum user bitrate of the PRCH). This comprises separate parameters for each of the UL and DL.

Priority, Pri. This parameter can assume a value within the interval $[0, Pri_{max}]$. The priority can be assigned on the basis of the mobile station initiating the call or being called, or on another basis.

A service request is evaluated through the service request evaluation function 408. In the service request evaluation, the PRCH manager 402 sends a PRCH admission request for a packet call to one of PRCH controllers 406a, 406b, 406c, or 406d. PRCH manager 402 will try each PRCH controller 406a, 406b, 406c, or 406d until admission is granted or the packet call is not admitted in any of the PRCHs. If the packet call is not admitted in any of the existing PRCHs (the PRCH admission request is denied by all PRCH controllers 406a, 406b, 406c, and 406d), PRCH manager 402 decides if the service request should be denied or if the packet call should be put in the admission queue 420 by using the admission queue handling function 410.

A packet call placed in the admission queue is temporarily suspended, i.e., no information is allowed to be exchanged between the users. If the packet call is not placed in the admission queue, a service denied signal is sent to the user. If the packet call is to be placed in the admission queue, the PRCH manager informs the users by sending a packet call suspend indication signal.

A packet call expelled indication signal is received in PRCH manager 402 from a PRCH controller when a packet call is expelled from a PRCH due to congestion. A packet call expelled indication signal is evaluated through the packet call expelled evaluation function 422. In the packet call expelled evaluation function 422 the PRCH manager 402 sends a PRCH admission request for the expelled packet call to one of PRCH controllers 406a, 406b, 406c or 406d. PRCH manager 402 will try each PRCH controller 406a, 406b, 406c or 406d until admission is granted or the expelled packet call is not admitted in any of the PRCHs.

If the packet call is not admitted in any of the existing PRCHs, PRCH manager 402 decides if the expelled packet call should be detached or if the expelled packet call should be put in the admission queue 420 by using the admission queue handling function. If the expelled packet call placed in admission queue 420, the packet call is temporarily suspended and a packet call suspend indication signal is sent to the user via NW/PS 222. If the expelled packet call is not placed in the admission queue 420, a packet call detach indication signal is sent to the user via NW/PS 222.

A packet call admission queue signal indicates that the admission queue 420 should be checked. The admission queue signal may be generated by a timer set as the system operator desires. A packet call admission queue signal is evaluated through the admission queue handling function 410. In the admission queue handling function the PRCH manager 402 sends a PRCH admission request for the packet call in the admission queue with the highest priority to one of PRCH controllers 406a, 406b, 406c or 406d. PRCH manager 402 will send the admission request to each PRCH controller 406a, 406b, 406c or 406d until admission is granted or the packet call is not admitted in any of the PRCHs. If the packet call is admitted to any of the PRCHs, a packet call resume indication signal is sent to the user via NW/PS 222.

PRCH manager 402 also decides when it is necessary to set up a new PRCH or release an existing PRCH through the PRCH management function 412. In the case of both PRCH setup and PRCH release, a step up or release request signal is sent to resource manager 404 which controls the allocation of system resources for PRCHs. Resource manager 404 either denies or grants the request by sending a setup request grant or a setup request denied signal to PRCH manager 402 or sending a release request grant or release request denied signal to PRCH manager 402.

Each PRCH controller 406a, 406b, 406c and 406d supervises the traffic on one PRCH of the cell. There is one PRCH controller for each PRCH in a cell. Each PRCH controller 406a, 406b, 406c and 406d receives traffic information on the PRCH that it controls from NW/PS 222 in a packet report. The packet report is evaluated by the PRCH traffic supervision function, 414a, 414b, 414c or 414d, for the relevant PRCH. The information contained in the packet report is used to decide if new packet calls can be admitted to the PRCH through the PRCH admission control function, 416a, 416b, 416c or 416d, when an admission request is received from PRCH manager 402. The information contained in the packet report may also be used to decide if the PRCH congestion control function, 418a, 418b, 418c or 418d, should be used to expel an already admitted packet call due to PRCH overload. In this case a packet call expelled indication signal is sent to the PRCH manager. The PRCH manager then decides if the packet call should be temporarily suspended or detached through the packet call expelled evaluation function 422. Depending on this decision, the users are informed by a packet call suspend indication signal or a packet call detach indication signal.

Resource manager 404 controls the allocation of system resources for packet radio channels. The PRCH manager 402 may request that a new PRCH be set up or released by sending a PRCH setup/release request to resource manager 404. The PRCH manager 404 continuously monitors the size of the admission queue 420. Whenever the total requested traffic of all packet calls in the admission queue $P_q$ exceeds a limit $P_{new}$ PRCH set for the admission queue, a PRCH setup request is sent to the higher level resource manager 404. If $P_{new}$ PRCH is set to zero, the PRCH manager always requests more resources as soon as the existing PRCHs are full. As soon as the number of users attached to a PRCH is zero, a PRCH release request is sent to the resource manager 404. If granted, the PRCH is released.

PRCH manager 402 and PRCH controllers 406a, 406b, 406c and 406d may be implemented into the base stations, radio network controllers and mobile control nodes of a cellular system such as the system shown in FIG. 1. The actual implementation may be in either hardware or software, or in a combination of hardware and software, operating in conjunction with one or more processors. Processors and software for implementing these types of functions are well known in the art.

Referring now to FIGS. 5A, 5B, 5C and 5D, therein are shown traffic flow diagrams illustrating service request evaluation, packet call expelled evaluation, admission queue handling and PRCH management process steps, respectively, followed by PRCH manager 402 according to an embodiment of the present invention.

Figure 5A:
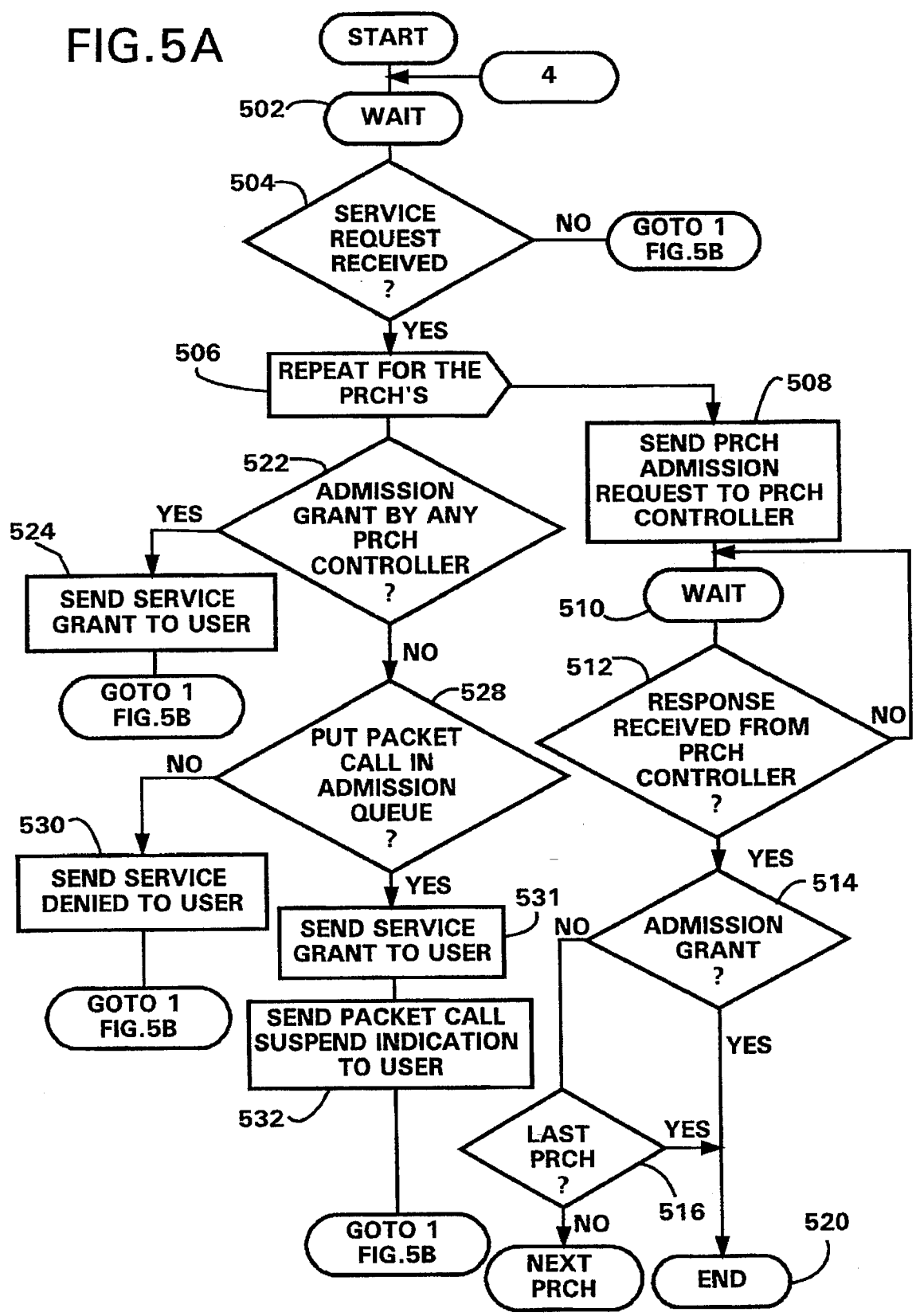

The PRCH manager 402 receives an input while in the wait state of Step 502 of FIG. 5A. The input may be a service request, a packet call expelled indication, an internally generated admission queue signal or, a PRCH setup grant or denied signal or release grant or denied signal received from resource manager 404. At Step 504 it is determined if a service request was received from NW/PS 222. If a service request was not received, the process moves to Step 534 of FIG. 5B. If, however, a service request was received, the process moves to Step 506 and begins the service request evaluation.

The service request evaluation of Step 506 involves requesting PRCH admission in Steps 508, 510, 512, 514, 516, 518 and 520. The service request evaluation is repeated for each PRCH controller 406a, 406b, 406c and 406d, sequentially, until admission to a PRCH is granted or no PRCHs remain. At Step 508 PRCH manager 402 sends a PRCH admission request to one of PRCH controllers 406a, 406b, 406c or 406d. The process then moves to Step 510 as PRCH manager 402 waits for a response. The PRCH manager 402 periodically checks at Step 512 to determine whether a response has been received from PRCH controllers 406a, 406b, 406c or 406d. If no response has been received, the process moves back to the wait state of 510. If, however, it is determined at Step 512 that a response has been received from PRCH controller 406a, 406b, 406c or 406d, the PRCH admission request process is completed and the process moves to Step 514, where it is determined if the response is an admission grant. If the response is an admission grant, the service request evaluation process is completed at Step 520 and the process moves to Step 522.

If, however, at Step 514, it is determined that the response is not an admission grant, it is an admission denied response, and the process moves to Step 516 where it is determined if the current response was sent from the last PRCH controller to which an admission request could be sent. If it was not the last PRCH controller, the process moves to Step 518 and continues the service request evaluation process of Step 506 for the next PRCH. The service request evaluation process of Step 506 is repeated until an admission grant response is received from PRCH controller 406a, 406b, 406c or 406d, or, until all PRCH controllers have denied admission. When the service request evaluation process is completed the process moves to Step 522.

At Step 522 it is determined if an admission grant response was received from any PRCH controller. If an admission grant was received from a PRCH controller, the process moves to Step 524 where a service grant signal is sent to the user via the NW/PS 308. From Step 524 the process then moves to Step 534 of FIG. 5B. If, however, at Step 522 it is determined that no admission grant was received from any PRCH controller the process moves to Step 528. At Step 528 PRCH manager 402 determines, using the admission queue handling function 410, if the packet call is to be put in the PRCH admission queue. It is determined to put the packet call in the admission queue 420 if the following criterion is fulfilled:

$$P_{ave}(r)+P_q(r)<P_{max}(r)$$

$P_{ave}(r)$ is the estimated average data traffic for the user as a function of the service request r. $P_q(r)$ is the requested traffic of all packet calls in the admission queue of service request type r. This is a measure of the current size of the queue. $P_{max}(r)$ is the maximum allowed requested traffic in the admission queue 420 as a function of the service request. It is possible to have a different $P_{max}$ for different types of service requests, r. Thereby a prioritization between different service requests can be done. For example, when requesting a PRCH during handoff $P_{max}(r)$ may be higher than $P_{max}(r)$ when requesting access to a PRCH for the first time.

If it is determined, at Step 528, that the packet call is to be put in the PRCH admission queue, the call identity is placed in the admission queue 420 and the process moves to Step 531 where a service grant signal is sent to the user via NW/PS 222. The process next moves to Step 532 where a packet call suspend indication signal is sent to the user via the NW/PS 308. The process then moves to Step 534 of FIG. 5B. If, however, at Step 528, it is determined that the packet call is not to be put in the PRCH admission queue 420 the process moves to Step 530 and a service denied signal 428 is sent to the user. The process then moves to Step 534 of FIG. 5B.

Figure 5B:
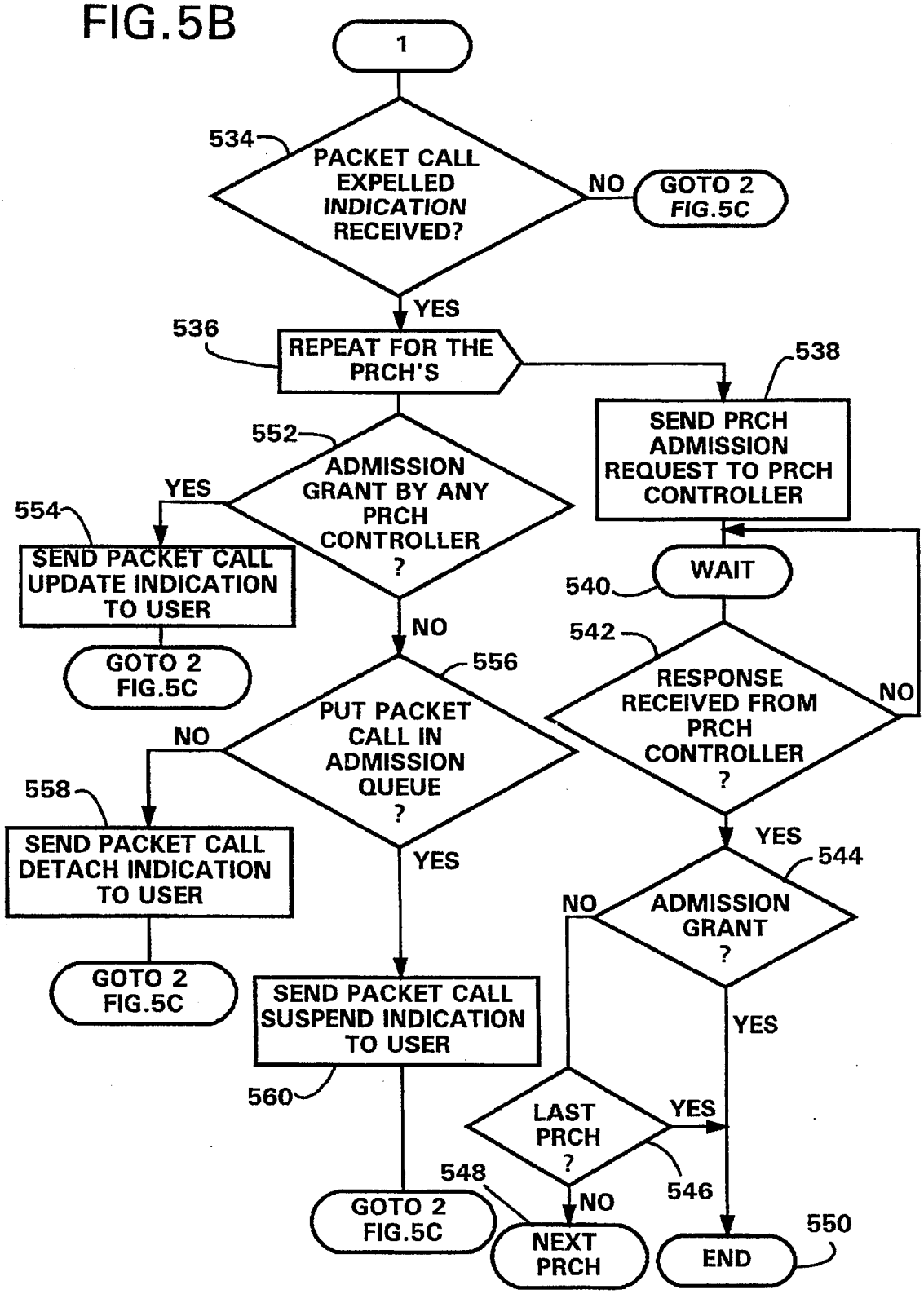

At Step 534 of FIG. 5B, it is determined if a packet call expelled indication was received. If the input was not a packet call expelled indication, the process moves to Step 562 of FIG. 5C. If, however, it is determined at Step 534 that a packet call expelled indication was received, the process moves to Step 536. At Step 536 a PRCH admission request for the expelled packet call is sent to PRCH controller 406a, 406b, 406c or 406d from PRCH manager 402. The admission request process of Step 536 involves Steps 538, 540, 542, 544, 546, 548 and 550. Step 536 is repeated for each PRCH controller 406a, 406b, 406c or 406d until admission has been requested to all PRCHs. At Step 538 PRCH manager 402 sends a PRCH admission request to PRCH controller 406a, 406b, 406c or 406d. The process then moves to Step 540 as PRCH manager 402 waits for a response. The PRCH manager 402 periodically checks at Step 542 to determine whether a response has been received from PRCH controller 406. If no response has been received, the process moves back to the wait state of Step 540. If, however, it is determined at Step 542 that a response has been received from the PRCH controller to which the admission request has been sent, the process moves to Step 544 where it is determined if the response if an admission grant. If the response is an admission grant, the packet call expelled evaluation ends at Step 550 and the process moves to Step 552. If, however, at Step 544, it is determined that the response is not an admission grant, it is an admission denied response and the process moves to Step 546 where it is determined if the admission denied response was sent from the last PRCH controller to which an admission request could be sent. If it was not the last PRCH controller, the process moves to Step 566 and repeats the admission request process of Step 536 for the next PRCH. The packet call expelled evaluation of Step 536 is repeated until an admission grant response is received from a PRCH controller or, until all PRCH controllers 406a, 406b, 406c and 406d have denied admission. When the packet call expelled evaluation process of Step 536 is completed, the process moves to Step 552.

At Step 552 it is determined if an admission grant response was received from any PRCH controller during Step 536. If an admission grant was received from a PRCH controller, the process moves to Step 554 where a packet call update indication signal is sent to the user via the NW/PS 222. From Step 554 the process moves to Step 562 of FIG. 5C. If, however, at Step 552 it is determined that an admission grant was not received, the process moves to Step 556. At Step 556 PRCH manager 402 determines, using the admission queue handling function 10, if the expelled packet call is to be put in the PRCH admission queue. The same admission criteria are used at Step 556 as was described for Step 528 of FIG. 5A. If it is determined at Step 556 to place the expelled packet call in the admission queue 420, the process moves to Step 560 and a packet call suspend indication signal is sent to the user via NW/PS 222. The process then moves from Step 560 to Step 562 of FIG. 5C. If, however, it is determined at Step 556 not to place the expelled packet call in the admission queue 420, the process moves to Step 558 and a packet call detach indication signal is sent to the user via NW/PS 222. The process then moves from step 558 to Step 562 of FIG. 5C.

Figure 5C:
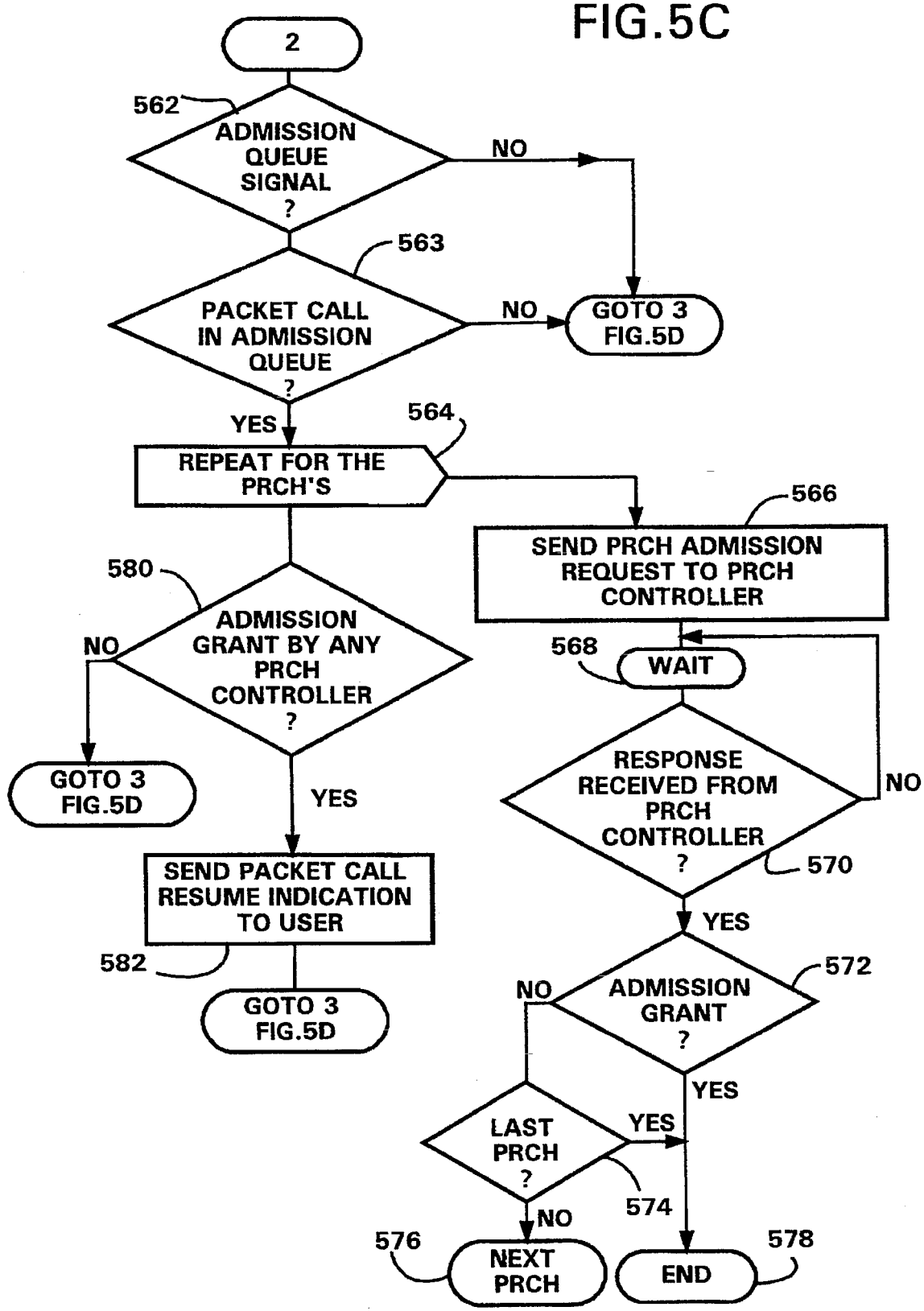

At Step 562 of FIG. 5C it is determined if an admission queue signal was received. If an admission queue signal was not received, the process moves to Step 584 of FIG. 5D. If, however, it is determined that an admission queue signal was received, the process moves to Step 563. At Step 563 it is determined if any packet calls are in the PRCH admission queue. If no packet calls are in the PRCH admission queue 420 of the cell, the process moves to the wait state of Step 502 in FIG. 5A. At Step 502 the process will wait for an input. If, however, it is determined at Step 563 that the PRCH admission queue 420 contains packet calls, the process moves to Step 564. At Step 564 a PRCH admission request for the packet call having a highest priority in the admission queue 420 is sent to PRCH controller 406a, 406b, 406c or 406d, from PRCH manager 402.

The admission request process of Step 564 involves Steps 566, 568, 570, 572, 574, 576 and 578. Step 564 is repeated for each PRCH controller, 406a, 406b, 406c or 406d, until admission to a PRCH is granted or, until admission has been requested to all PRCHs. At Step 566 PRCH manager 402 sends a PRCH admission request to PRCH controller 406a, 406b, 406c or 406d. The process then moves to Step 568 as PRCH manager 402 waits for a response. The PRCH manager 402 periodically checks at Step 570 to determine whether a response has been received from PRCH controller 406. If no response has been received, the process moves back to the wait state of 568. If, however, it is determined at Step 570 that a response has been received from the PRCH controller to which the admission request had been sent the process moves to Step 572, where it is determined if the response is an admission grant. If the response is an admission grant, the admission request process ends at Step 578 and the process moves to Step 586. If, however, at Step 572, it is determined that the response is not an admission grant, it is an admission denied response, and the process moves to Step 574 where it is determined if the admission denied response was sent from the last PRCH controller to which an admission request could be sent.

If it was not the last PRCH controller, the process moves to Step 566 and repeats the admission request process of Step 564 for the next PRCH. The admission request evaluation of Step 564 is repeated until an admission grant response is received from a PRCH controller or, until all PRCH controllers 406a, 406b, 406c and 406d have denied admission. When the admission request process of Step 564 is completed the process moves to Step 580.

At Step 580 it is determined if an admission grant response was received from any PRCH controller in Step 564. If an admission grant response was received from a PRCH controller, the packet call having a highest priority in the admission queue 420 is removed from the queue and the process moves to Step 582 where a packet call resume indication signal is sent to the user via the NW/PS 222. From Step 582 the process moves to Step 584 of FIG. 5D. If, however, at Step 580 it is determined that an admission grant was not received, the process moves directly to Step 584 of FIG. 5D.

At Step 584 of FIG. 5D it is determined if a PRCH setup grant was received from resource manager 402. If a PRCH setup grant was received from resource manager 402, the process moves to Step 586 and the PRCH manager creates a new PRCH controller. Next, the process moves to Step 592. If, however, at Step 584, it is determined that a PRCH release grant was not received, the process moves to Step 588 where it is determined if a PRCH release grant was received from resource manager 402. If a PRCH setup grant was received, the process moves to Step 590 where the PRCH manager deallocates resources from the PRCH controller for which the release request was sent. Next, the process moves to Step 592. If, however, at Step 590, it is determined that a PRCH setup grant was not received, the process moves directly to Step 592.

At Step 592 the requested traffic for all packet calls in the admission queue are evaluated. Next, at Step 594, it is determined if a new PRCH is required. If the total requested traffic of all packet calls in the admission queue $P_q$ exceeds a limit $P_{new}$ PRCH set for the admission queue, a new PRCH is required and the process moves to Step 596. At Step 596 a PRCH setup request is sent to resource manager 404. From Step 596 the process returns to the wait state of Step 502. If, however, at Step 594 it is determined that a new PRCH is not required, the process moves to Step 597. At Step 597 the number of packet calls on each PRCH is evaluated. Next, at Step 598, it is determined if any PRCH exists that is not carrying any packet calls. If it is determined that no PRCH not carrying any packet calls exists, the process returns to Step 502 of FIG. 5A. If, however, at Step 598 it is determined that one or more PRCHs exist that are not carrying packet calls, the process moves to Step 599 where a PRCH release request is sent to resource manager 404 for each PRCH not carrying any packet call. From Step 599 the process returns to the wait state of Step 502 of FIG. 5A.

Figure 6:
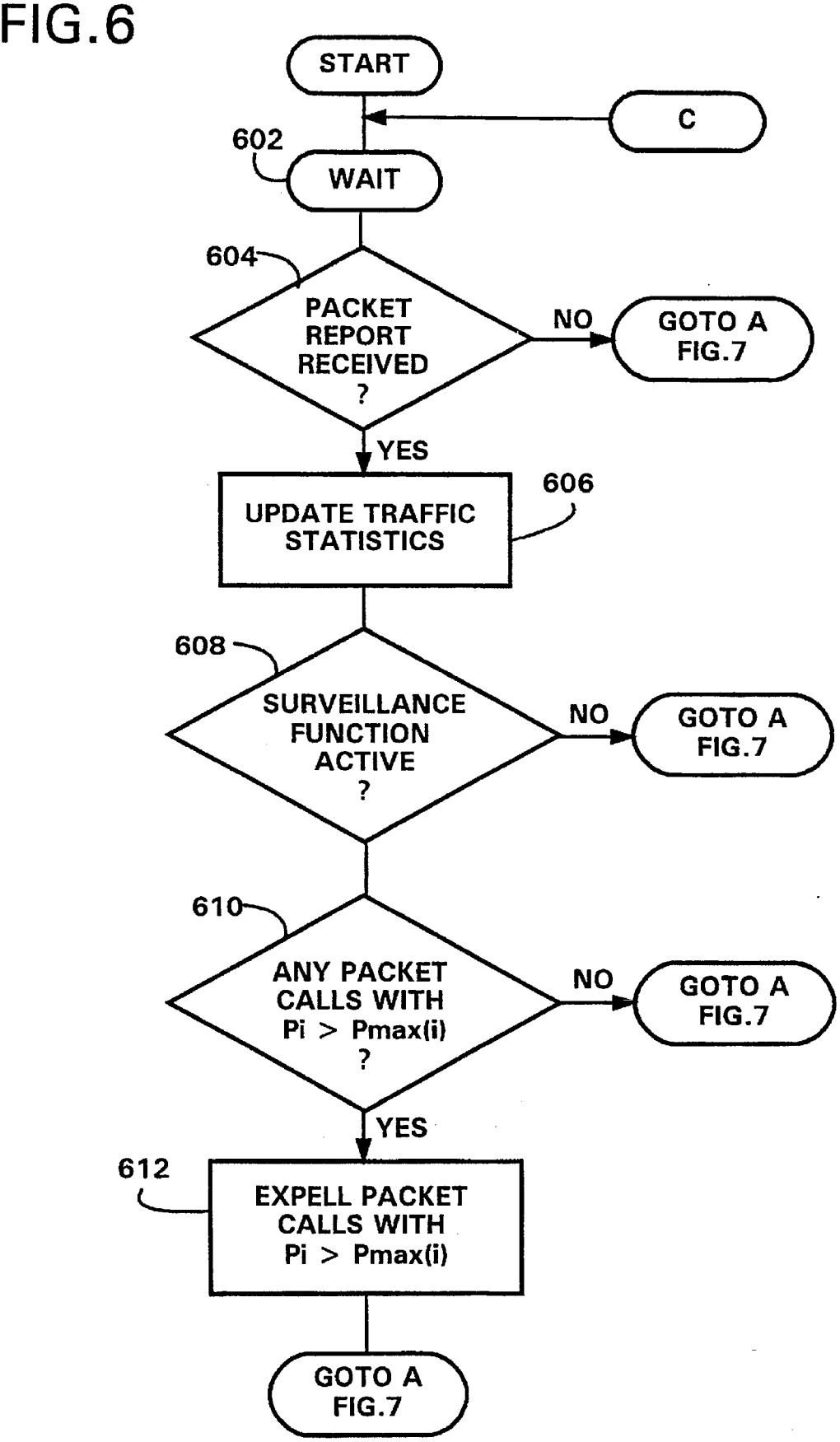
FIG. 6 is a flow diagram illustrating process steps followed by the packet radio channel controller traffic supervision function according to an embodiment of the present invention.
Figure 7:
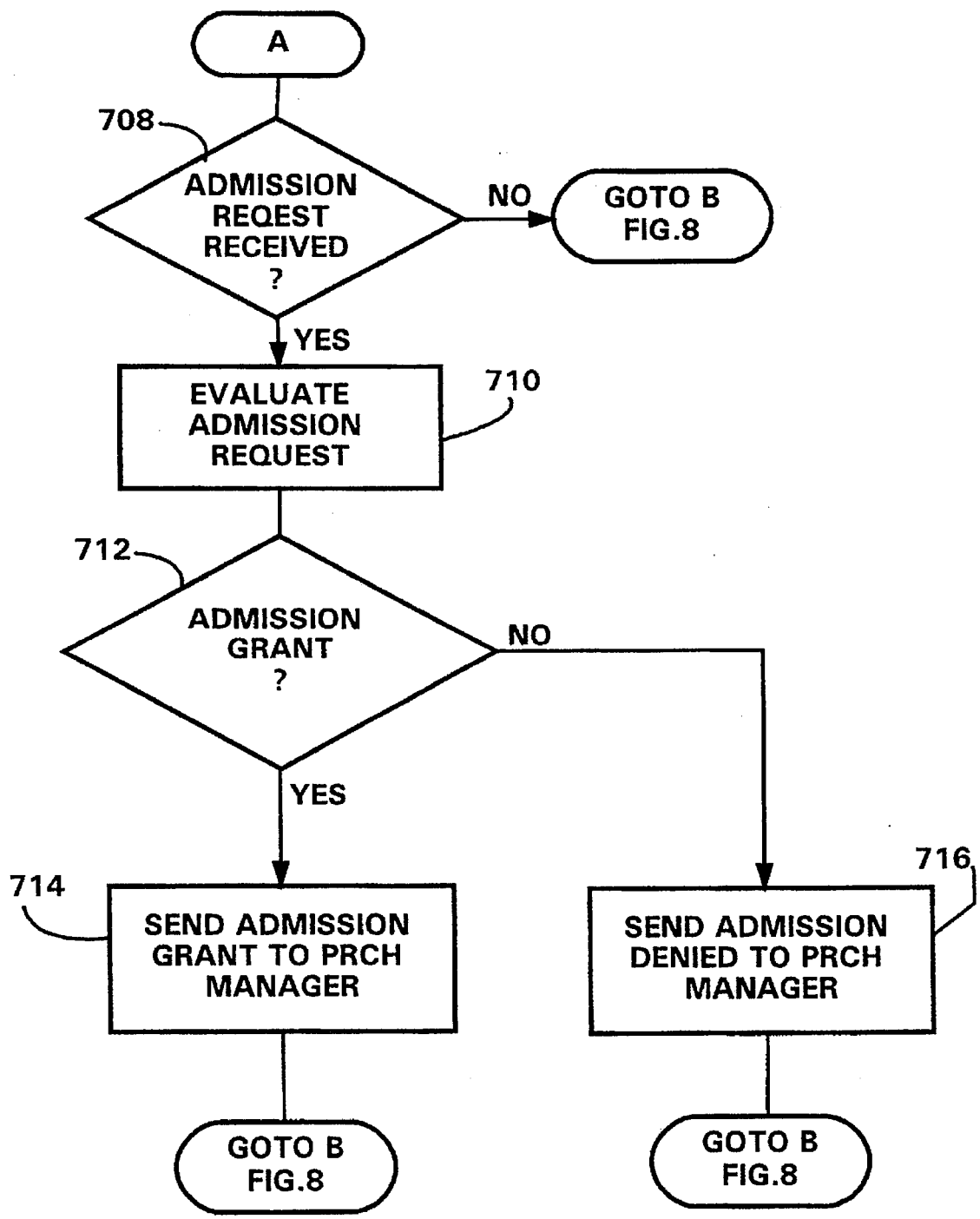
FIG. 7 is a flow diagram illustrating process steps followed by the packet radio channel controller admission control function according to an embodiment of the present invention.
Figure 8A:
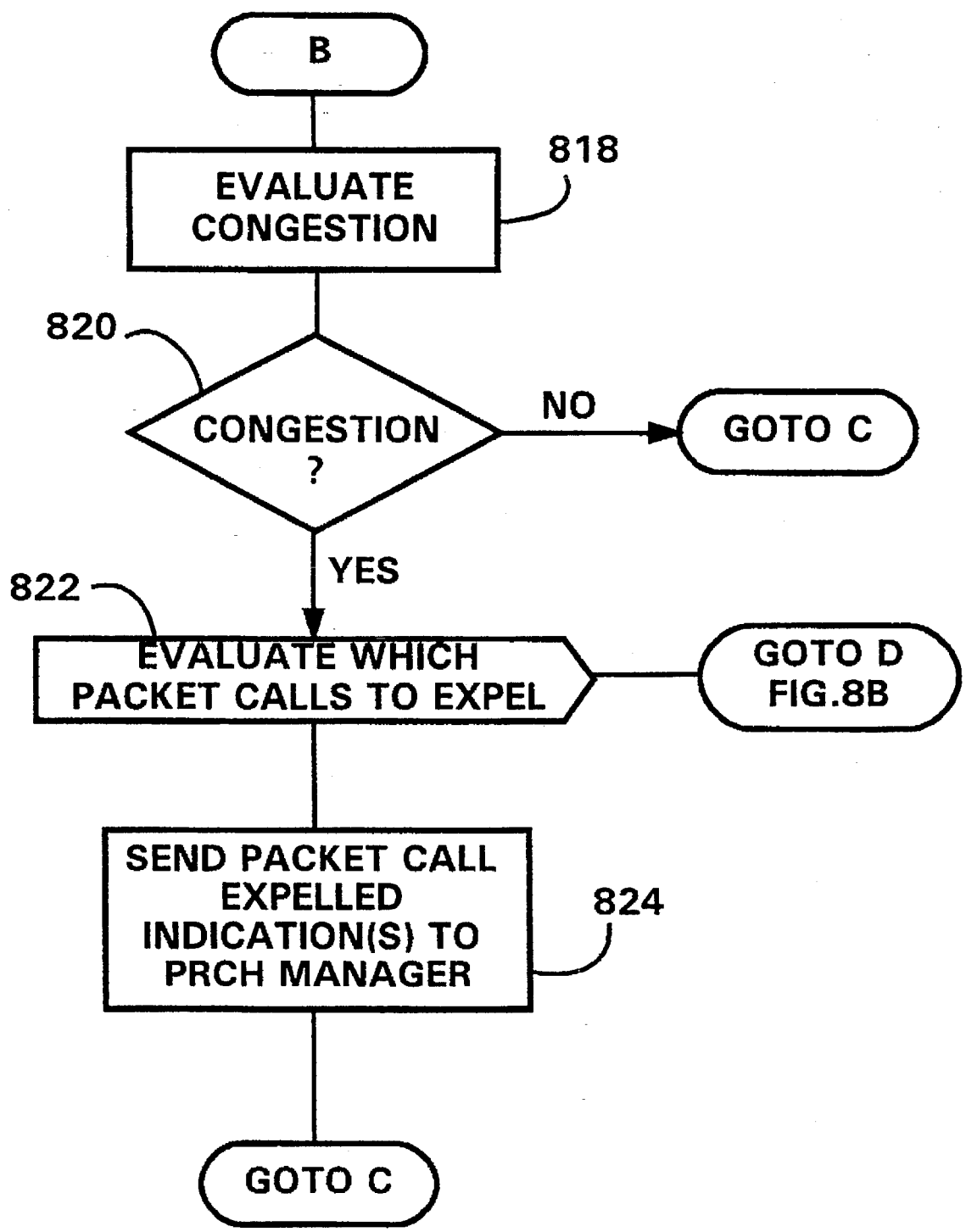
Figure 8C:
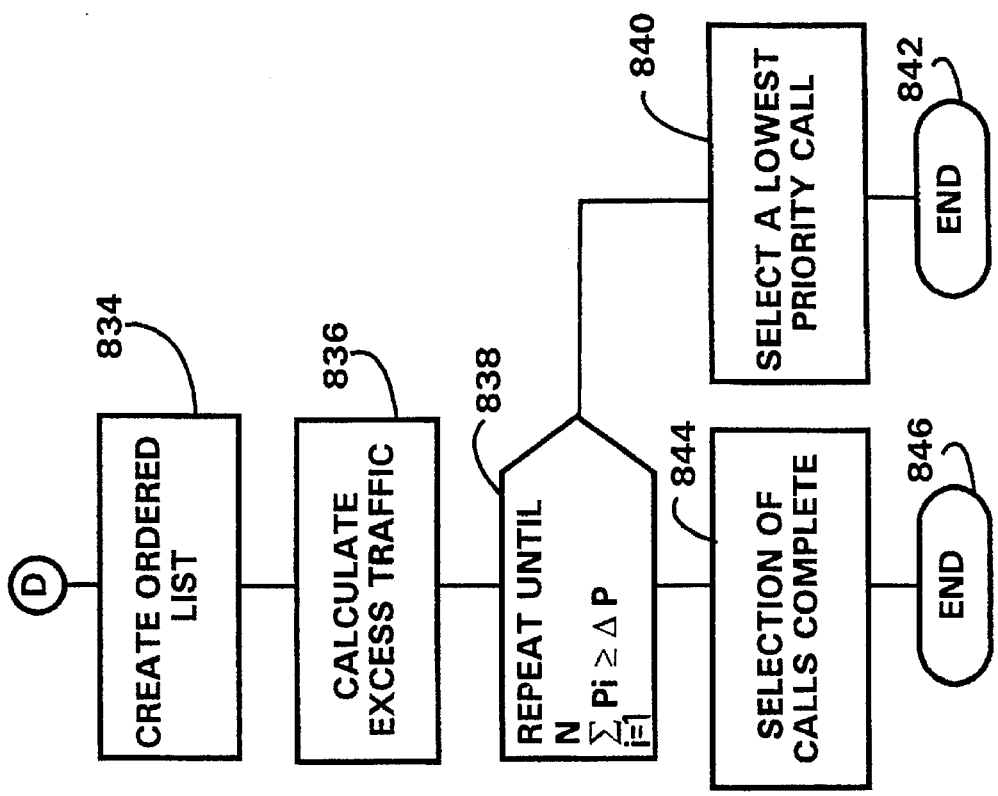
Figure 8B:
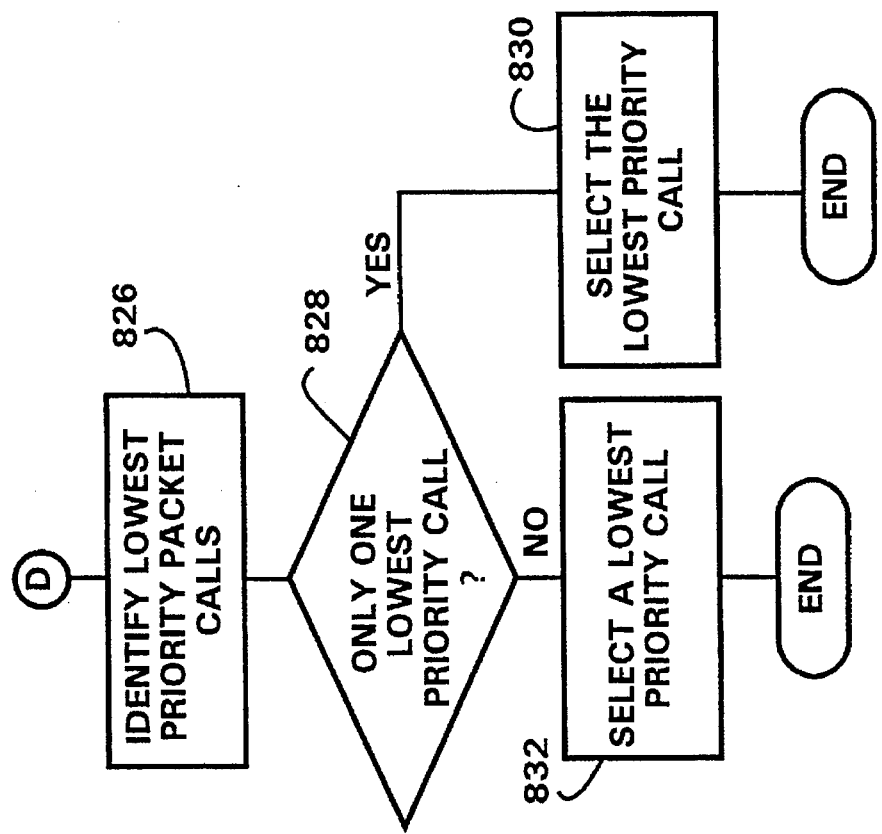

Referring now to FIGS. 6, 7 and 8, therein are illustrated flow diagrams showing Steps followed by each PRCH controller, 406a, 406b, 406c or 406d, for the PRCH traffic supervision, PRCH admission control and PRCH congestion control processes, respectively, according to an embodiment of the present invention. PRCH controllers 406a, 406b, 406c and 406d each continuously supervise data traffic, the average packet delay and, also receive admission requests for a PRCH.

When initially activated upon receiving an input from PRCH manager 402, the process is in the wait state of Step 602 of FIG. 6. While in the wait state of Step 602, each PRCH controller 406a, 406b, 406c and 406d may receive an input in the form of a packet report from the NW/PS 222, an admission request from PRCH manager 402 or an internally generated activation signal indicating a PRCH congestion check should be done. Upon receiving an input the process moves to Step 604 where it is determined if a packet report was received. If it is determined that a packet report was not received, the process moves directly to Step 708 of FIG. 7. If, however, at Step 604, it is determined that a packet report was received, the process will move to Step 606 where the PRCH traffic supervisor function 428 updates traffic statistics, which includes packet delay and load on the PRCH, for the relevant PRCH. The traffic statistics are updated using information contained in the packet report. Each packet report contains the following information:

1) Transmitting mobile user identity for UL or transmitting network user identity for DL.
2) Packet size.
3) Time stamp (indicating when the packet was created).
4) Packet type (UL or DL).

Using the information contained in the packet report the PRCH controller calculates an estimate of the average packet delay T, and an estimate of the data traffic from each packet call Pi. These quantities are used for the admission control process (FIG. 7) and the congestion control process (FIG. 8). After updating the traffic statistics the process then moves to Step 708 of FIG. 7.

FIG. 7 illustrates the steps performed by packet radio channel admission control function of the invention. At Step 708 it is determined if the input was an admission request. If an admissions request was not received, the process will move directly to Step 818 of FIG. 8. If however, at Step 708, it is determined that an admission request was received, the process will move to Step 710 where the admission request is evaluated.

The PRCH admission control function 416 allows the PRCH admission request if the following criterion is fulfilled:

$$p_{ave} \Sigma p_i < p_{tol}, i \in U(Pri)$$

$p_{ave}$ is the average data traffic required for the new packet call.

$p_i$ is the estimated data traffic from packet call i.

U (pri) are the packet calls with priorities higher than or equal to Pri, where Pri is the priority for the requested packet call.

$p_{tol}$ is the maximum tolerable data traffic on the PRCH.

From the above equation, traffic from packet calls with priority higher than or equal to the priority of the new packet call must be less than the maximum tolerable traffic $p_{tol}$. Thus, a high priority packet call may be allowed to use the PRCH although the total traffic (including all packet calls regardless of priority) exceeds the maximum tolerable traffic $p_{tol}$. In that case the congestion control function (FIG. 8) will expel low priority packet calls so that the total traffic will fall below the maximum tolerable traffic $P_{tol}$. The maximum tolerable traffic $p_{tol}$ is associated with the maximum tolerable delay, $T_{tol}$, according to the relation:

$$P_{tol} = \sum_i P_i + \Delta P_p$$

$$\Delta P = f(T_{tol} - T)$$

where f is a function having the same sign as its argument. T is the estimation of the average packet delay that is calculated by PRCH traffic supervision function. Because the PRCH controller traffic supervision function continuously monitors T, $P_{tol}$ is continuously updated according to the above equations. $P_{tol}$ will correspond to the traffic level that results in the maximum tolerable delay $T_{tol}$.

Next, at Step 712 it is determined if admission to the PRCH was granted or denied. If admission is granted the process moves to Step 714 where an admission grant is sent to PRCH manager 402. If admission is not granted the process moves to Step 716 where an admission denied is sent to the PRCH manager 402. After the PRCH admission control function 416 sends an admission grant or denial at Step 714 or 716, respectively, the process then moves to Step 818 of FIG. 8.

At Step 818 the PRCH congestion control function 418 evaluates congestion on the PRCH. If it is determined that there is no congestion on the PRCH, the process returns to the wait state of Step 602 in FIG. 6. If, however, at Step 820 it is determined that there is congestion, the process moves to Step 822 where an evaluation is made as to which packet call or packet calls to expel. To evaluate congestion the average packet delay, T is checked. A delay alarm level set by the system operator, $T_{con}$, is used to detect a congestion situation, i.e. when it is necessary to expel one or more packet calls from the PRCH in order to regain a tolerable average packet delay.

If it is determined that $T < T_{con}$ there is no congestion on the PRCH and the process returns to the wait state of Step 602 in FIG. 6. If, however, at Step 820 it is determined that $T \geq T_{con}$ there is congestion and the process moves to Step 822, where an evaluation is made as to which packet call or packet calls to expel. The evaluation of Step 822 is done in the following manner:

1) Starting with low priority packet calls, the following check is done for all packet calls:

$$P_i \leq P_{max}(i)$$

is the estimated traffic for packet call i and $P_{max}(i)$ is the required maximum data traffic for the same packet call. If the above Equation is not fulfilled, packet call i is expelled from the PRCH.

2) If the Equation is fulfilled for all packet calls, one or more lowest priority packet calls are expelled.

Thus, packet calls having an estimated traffic that exceeds the maximum value given by their service request are expelled first. If all packet calls' estimated traffic are below their limits one or more lowest priority packet calls are expelled.

When a packet call is expelled from a PRCH due to congestion a packet call expelled indication (resume request) is sent to the PRCH manager 402 at Step 824 indicating which packet calls are to be expelled from the PRCH. After sending a packet call expelled indication the PRCH controller process then moves to the wait state of Step 602 in FIG. 6.

Referring now to FIG. 9, therein is a flow diagram illustrating process steps followed by the resource manager function according to an embodiment of the invention. The resource manager process is in the wait state of Step 902 when an input is received from the PRCH manager 402. The input may be a PRCH setup request or a PRCH release request. Upon receiving an input, the process moves to Step 904. At Step 904 it is determined if the input is a PRCH setup request. If the input is a PRCH setup request, the process moves to Step 906.

At Step 906 the PRCH setup request is evaluated. The resource manager evaluates the setup request by determining if adequate resources exist within the cell to allow a new PRCH to be set up. From Step 906 the process moves to Step 910. At Step 910 it is determined if the setup request evaluation indicates a new PRCH may be set up. If it is determined that a new PRCH may be set up, the process moves to Step 916 where a PRCH setup grant is sent to PRCH manager 402. Next, at Step 918, the resource manager allocates resources for a new PRCH. From Step 918 the process returns to the wait state of Step 902. If, however, at Step 910 it is determined that the setup request evaluation indicates that a new PRCH may not be set up, the process moves to Step 914 where a PRCH setup denied is sent to PRCH manager 402. From Step 914 the process returns to the wait state of Step 902.

If the input is determined not to be a PRCH setup request at Step 904, it is a PRCH release request. In this case the process moves from Step 904 to Step 912. At Step 912 the PRCH release request is evaluated. The resource manager evaluates the PRCH release request by determining whether it is acceptable to release the PRCH from an overall system point of view. For example, the traffic load on PRCHs of surrounding cells could be taken into account. From Step 912 the process moves to Step 920. At Step 920 it is determined if the PRCH release request evaluation indicates a PRCH may be released. If it is determined that the PRCH may be released, the process moves to Step 922 where a PRCH release grant is sent to PRCH manager 402. Next, at Step 926, the resource manager releases the PRCH. From Step 926 the process returns to the wait state of Step 902. If, however, at Step 920, it is determined the PRCH release request evaluation indicates that the PRCH may not be released, the process moves to Step 924 where a PRCH release denied is sent to PRCH manager 402. From Step 924 the process returns to the wait state at Step 902.

As can be seen from the above description, the method and system of the invention can be used by a system operator to manage packet traffic for prioritized users on one or more PRCHs of a cellular telecommunications system. The system operator can set a maximum average time delay for the PRCH. The users can be prioritized according to a level of service subscribed to or a priority could be assigned automatically or chosen by the user depending on the type of call being made. A higher priority level may incur a higher charge rate for using the system. Paying the higher rate allows the user to be prioritized before other uses having lower priorities in congestion situations and when trying to access the system. By making packet traffic management decisions based on the estimated data traffic required by the packet call and the priority of the packet call, a system operator can be assured that PRCH users are not subject to unacceptable PRCH delays.

It is believed that the operation and construction of the present invention will be apparent from the foregoing description and, while the invention shown and described herein has been described as a particular embodiment, changes and modifications may be made therein without departing from the spirit and scope of the invention as defined in the following claims.

What is claimed is:

1. In a cellular telecommunications system comprising a plurality of transceiving stations each capable of transmitting and receiving data packets on at least one packet radio channel, a method of controlling admission to a packet switched radio channel, said method comprising the steps of:

(a) receiving, for a requested packet call, an admission request to a packet switched radio channel;

(b) determining whether estimated data traffic caused by other packet calls currently using said packet radio channel together with an estimated data traffic for said requested packet call are within a maximum tolerable traffic level for said packet radio channel;

(c) confirming that each of said other packet calls have a priority value at least as great as the priority value of said requested packet call; and (d) determining from results of steps (b) and (c) whether said admission request is to be granted.

2. The method of claim 1 further comprising, in response to a negative determination during said step of determining, the step of sending an admission denied message for said packet call.

3. The method of claim 1 further comprising, in response to a positive determination during said step of determining, the step of sending an admission granted message for said packet call.

4. The method of claim 1 in which said admission request comprises said priority value of said requested packet call.

5. The method of claim 4 in which said admission request further comprises a value of said estimated data traffic for said requested packet call.

6. The method of claim 1 in which said maximum tolerable traffic level is defined as a sum of the estimated data traffic from all packet calls using said packet radio channel plus a value ΔP, wherein ΔP is a function of the difference between a maximum tolerable packet delay and an estimated average packet delay on said packet radio channel.

7. The method of claim 1 in which said plurality of transceiving stations comprises a plurality of mobile stations and at least one base station, and said step of receiving comprises receiving an admission request to a packet switched radio channel used for communications from a mobile station to a base station.

8. The method of claim 1 in which said plurality of transceiving stations comprises a plurality of mobile stations and at least one base station, and said step of receiving comprises receiving an admission request to a packet switched radio channel used for base station to mobile station communications.

9. In a cellular telecommunications system comprising a plurality of transceiving stations each transceiving data packets on a packet switched radio channel, an apparatus for controlling admission to a packet switched radio channel, said apparatus comprising:

means for receiving an admission request to a packet switched radio channel for a requested packet call;

first means for determining if each of a plurality of other packet calls upon said packet radio channel has an assigned priority value at least as great as the assigned priority value of the requested packet call; and second means for determining whether said admission request is to be granted in response to the first means for determining.

10. The apparatus of claim 9 further comprising means for sending an admission denied message for said requested packet call in response to a determination determined by said means for determining, that said admission request is not to be granted.

11. The apparatus of claim 9 further comprising means for sending an admission granted message granting admission requested for said packet call upon the packet switched radio channel in response to a determination determined by said means for determining, that said admission request is to be granted.

12. The apparatus of claim 9 in which said means for determining further estimates whether estimated data traffic caused by other packet calls generated upon said packet radio channel together with an estimated data traffic for said requested packet call are within a maximum tolerable traffic level for said packet radio channel.

13. The apparatus of claim 12 in which said admission request comprises a value of said estimated data traffic for said requested packet call.

14. The apparatus of claim 12 in which said maximum tolerable traffic level is defined as a sum of the estimated data traffic from all packet calls using said packet radio channel plus a value ΔP, where ΔP is a function of the difference between a maximum tolerable packet delay and an estimated average packet delay on said packet radio channel.

15. The apparatus of claim 9 in which said admission request comprises said priority value of said requested packet call.

16. The apparatus of claim 15 in which said admission request further comprises a value of said estimated data traffic for said packet call.

17. The apparatus of claim 9 in which said plurality of transceiving stations comprises a plurality of mobile stations and at least one base station, and said means for receiving comprises means for receiving, for a packet call, an admission request to a packet switched radio channel used for communications from a mobile station to a base station.

18. The apparatus of claim 9 in which said plurality of transceiving stations comprises a plurality of mobile stations and at least one base station, and said means for receiving comprises means for receiving, for a packet call, an admission request to a packet switched radio channel used for communications from a base station to a mobile station.

19. In a cellular telecommunications system comprising a plurality of transceiving stations each capable of transmitting and receiving data packets on at least one packet radio channel, a method of controlling admission to a packet switched radio channel, said method comprising the steps of:

receiving an admission request to a packet switched radio channel for a requested packet call;

evaluating whether estimated data traffic caused by other packet calls currently using said packet radio channel together with an estimated data traffic for said requested packet call are not greater than a sum of the estimated data traffic from all packet calls using said packet radio channel plus a value ΔP, wherein ΔP is a function of a difference between a maximum tolerable packet delay and an estimated average packet delay on said packet radio channel; and determining from results of said step of evaluating whether said admission request is to be granted.

20. In a cellular telecommunications system comprising a plurality of transceiving stations each transceiving data packets on a packet switched radio channel, an apparatus for controlling admission to a packet switched radio channel, said apparatus comprising:

means for receiving an admission request to a packet switched radio channel for a requested packet call;

means for evaluating whether estimated data traffic caused by other packet calls generated upon said packet radio channel together with an estimated data traffic for said requested packet call are not greater than a sum of the estimated data traffic from all packet calls using said packet radio channel plus a value ΔP, where ΔP is a function of the difference between a maximum tolerable packet delay and an estimated average packet delay on said packet radio channel; and means for determining from said evaluation whether to grant said admission request.

* * * * *

UNITED STATES PATENT AND TRADEMARK OFFICE
CERTIFICATE OF CORRECTION

PATENT NO. : 5,666,348
DATED : Sep. 9, 1997
INVENTOR(S) : Thornberg et al.

It is certified that error appears in the above-identified patent and that said Letters Patent is hereby corrected as shown below:

Column 13, line 43    Replace "f"
                      With --$f$--

Signed and Sealed this

Twentieth Day of January, 1998

Attest:

BRUCE LEHMAN

*Attesting Officer*    *Commissioner of Patents and Trademarks*